United States Patent [19]

Lefeuvre

[11] 3,924,875

[45] Dec. 9, 1975

[54] SLIDING FITMENT FOR SAFETY BELT

[75] Inventor: Andre Lefeuvre, Noisy-le-Roi, France

[73] Assignees: Regis Nationale des Usines Renault, Billancourt; Automobiles Peugeot, Paris, both of France

[22] Filed: Jan. 11, 1974

[21] Appl. No.: 432,619

[30] Foreign Application Priority Data

Feb. 15, 1973 France .............................. 73.05415

[52] U.S. Cl. .......................... 280/150 SB; 180/82 C
[51] Int. Cl.² .......................................... B60R 21/10
[58] Field of Search ............. 280/150 SB; 180/82 C; 297/388, 389

[56] References Cited
UNITED STATES PATENTS

| | | | |
|---|---|---|---|
| 2,705,529 | 4/1955 | Bull | 280/150 SB |
| 3,535,001 | 10/1970 | Lewis | 280/150 SB |
| 3,765,700 | 10/1973 | Littman | 280/150 SB |

*Primary Examiner*—Robert R. Song
*Attorney, Agent, or Firm*—Stevens, Davis, Miller & Mosher

[57] ABSTRACT

A safety belt system incorporating spring tensioning means and a fitment through which a tensioned run of the belt slides, said fitment incorporating a brake shoe driven to clampingly engage the safety belt strap, and the brake shoe being connected to the body of said fitment by means of links pivotally connected to the body and the brake shoe.

6 Claims, 8 Drawing Figures

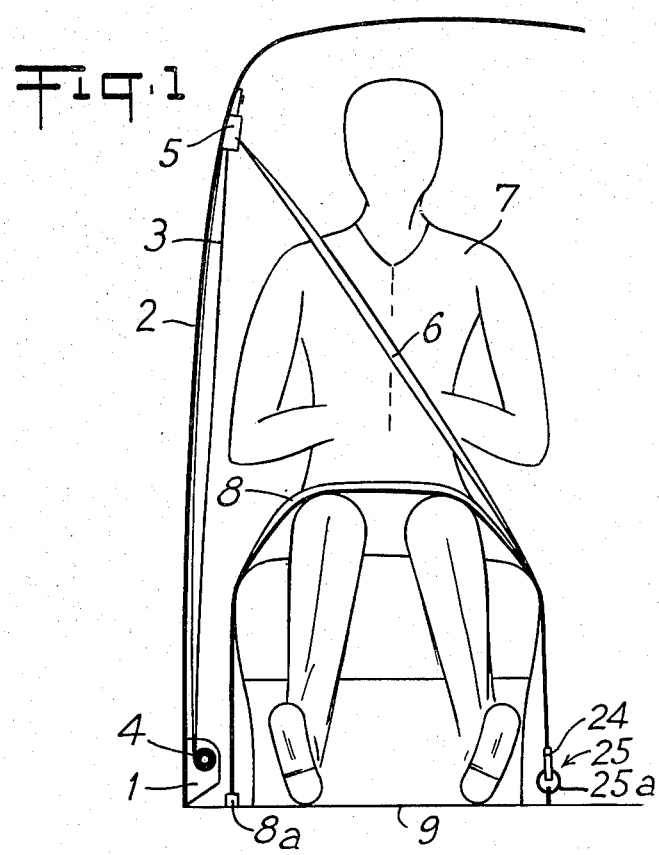
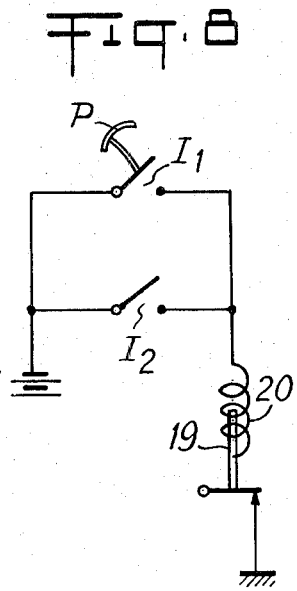
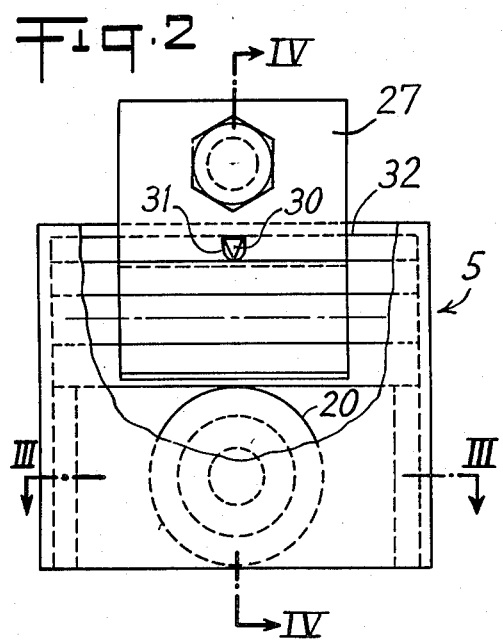
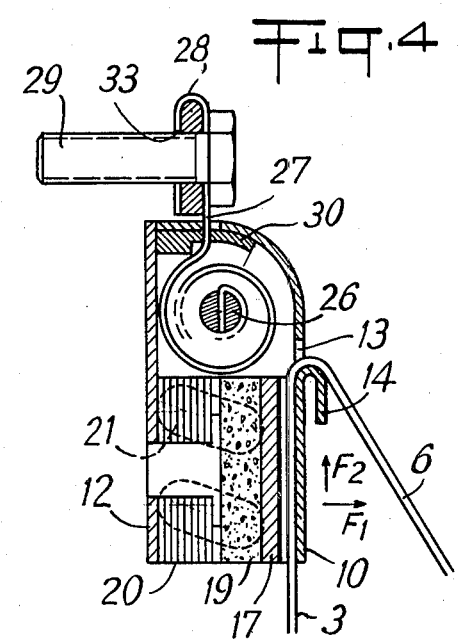

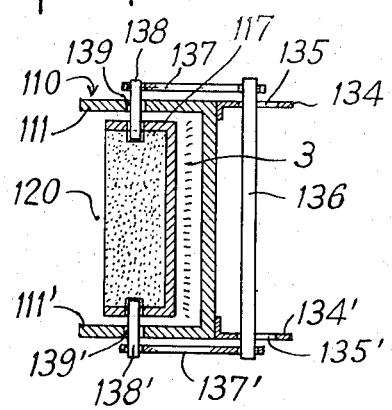
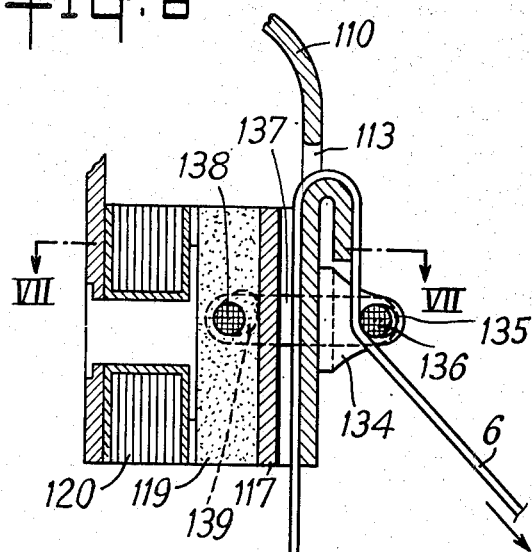
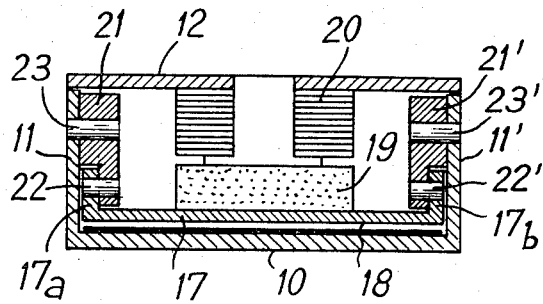
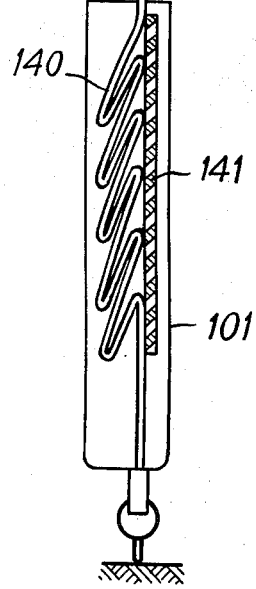
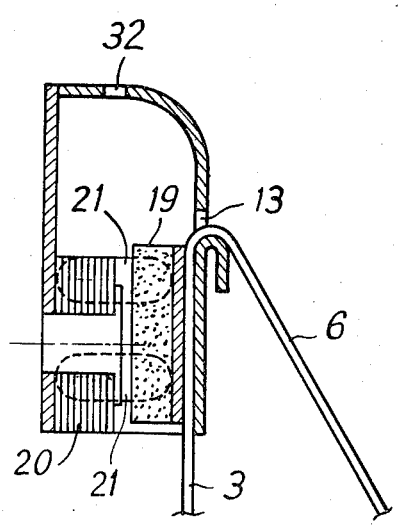

SLIDING FITMENT FOR SAFETY BELT

The present invention relates to a sliding fitment for safety belt and more particularly a sliding fitment comprising means for clamping the strap which are actuated when the body of a vehicle occupant transmits a violent force to the belt, especially upon an abrupt deceleration of the vehicle.

U.S. Pat. No. 3,506,083 discloses means for clamping a strap of a safety belt which comprise a jack, an arm actuated by the jack and a cylinder integral with said arm and capable of clamping the strap between the cylinder and a plate. The magnitude of the forces applied to the cylinder shortens the useful life of the straps.

From U.S. Pat. No. 2,705,529 means are known for clamping a strap of a safety belt which comprise an electro-magnet, a spring biased arm attracted by the magnet, and a brake shoe integral with said arm and capable of contacting the strap when the electro-magnet is energised. Since they use resilient elements which are strictly calibrated these means have to be assembled with special care so as to preclude accidental contact between the brake shoe and the strap prior to energisation of the magnet.

According to the invention there is provided a fitment for slidably receiving the strap of a safety belt comprising a fitment body, a brake shoe connected to the fitment body by at least one pair of connecting links articulated to the shoe and to the body and means for driving the brake shoe into a clamping position in which it clamps the belt relative to the body.

In this manner the links which carry the shoe are directly connected to the body of the fitment and the force of application of the shoe on the strap is directly applied to said shoe.

To assist the resilient strap tensioning device to free the strap by causing the shoe to withdraw when the violent force applied to the belt has subsided, the fitment body will be arranged in the vehicle such that as the strap is clamped the shoe exerts a self-locking movement on the strap which resists extension of the run of the strap which passes across the body of the wearer.

Advantageously the shoe may be driven toward the strap by electro-magnetic means.

According to a further characteristic of the invention the initial movement of the shoe toward the strap is ensured by a cross tie on which the force applied to the belt is directly exerted upon deceleration of the vehicle.

In order that the invention may more readily be understood, the following description is given, merely by way of example, of two embodiments, reference being made to the accompanying drawings in which:

FIG. 1 is a schematic view showing the arrangement of a safety belt restraining a vehicle occupant;

FIG. 2 is a head-on view of one embodiment of the sliding fitment according to the invention;

FIG. 3 is a view in section of the fitment taken along line III—III of FIG. 2;

FIG. 4 is a view in section of the fitment taken along line IV—IV of FIG. 2;

FIG. 5 is a view in section, similar to FIG. 4, of the fitment in clamping position;

FIG. 6 is a view in longitudinal section of a further embodiment of the fitment;

FIG. 7 is a view in section of the fitment taken along line VII—VII of FIG. 6; and FIG. 8 is a simplified diagram of one embodiment of the supply circuit of the electromagnetic control means.

FIG. 1 shows a safety belt which comprises a webbing strap 3 having one end wound on a reel 4 of a tensioning device 1 secured, for example, to the lower portion of one of the side pillars 2 of an automotive vehicle, in such manner that the strap 3 is capable of being pulled upwardly from the tensioning device. It should be noted that the tensioning device could equally well be integral with the seat of the vehicle. The tensioning device includes a coiling reel 4 mounted on a shaft provided in known manner with a return spring, not shown, to exert a biasing torque to be overcome for withdrawing the strap 3.

From the reel 4 the strap 3 passes through a sliding fitment according to the invention, which is secured to the upper portion of the side pillar 2 or to the longitudinal structural member situated at the base of the roof. After passing through the fitment 5 the portion of the strap 3 passing diagonally in front of the chest of the passenger schematically shown at 7 serve as shoulder strap 6.

The belt also includes a lap strap 8 which passes transversely in front of the passenger and is attached at either side to the floor 9.

The lap strap 8 is fixed to the floor 9 by the anchorage 8a and is connected to the shoulder strap 6 by the element 24 of a fixing ring 25 of the belt provided with an anchorage 25a.

FIGS. 2 to 5 show in greater detail one embodiment of the sliding fitment 5 which comprises a sheet metal body 10 of U-shaped section the wings 11, 11' of which are rendered mutually integral by a base plate 12.

The body 10 also comprises a window 13 having a lower edge 14 which is turned down so as to form a slide surface for the shoulder strap 6.

On the base plate 12 there is mounted an electrically energisable coil 20 which co-operates with a movable armature 19 of magnetic material which has already been magnetised and is integral with a shoe 17. The armature 19 is pushed back by the magnetic flux of the coil 20 when the latter is energised.

The shoe 17 consists of a plate of sheet metal having on one face a friction lining shown schematically at 18 and having in section (FIG. 3) two lateral wings 17a, 17b disposed between the wings 11, 11' of the fitment body 10.

The shoe 17 is connected to the body 10 by two sets of links 21, 21' which are articulated on the one hand to the side wings 17a, 17b of the shoe 17 by a first set of pivot pins 22, 22' and on the other hand to the wings 11, 11' of the fitment body 10 by a second set of pivot pins 23, 23'.

Furthermore, the fitment 5 is attached to the body of the vehicle by a shock abosrbing device incorporated in the body 10. The shock absorbing device comprises a shaft 26 disposed between the wings 11, 11' and capable of moving therebetween; on the said shaft 26 there is wound a clockspring 27 of sheet metal, the free end of the spring being engaged in a through slit 32 of the body 10 and bent over so as to form a plate 28 having a through bore 33 in which there is engaged a bolt 29 for securing the fitment body to the vehicle body. It should, however, be noted that the shaft 26 is not connected to the body 10 of the fitment but is merely loosely located therewithin.

The upper wall of the body 10 carries a knife member having a triangular section blade 30 which is directed toward the shaft 26 and is engaged in an orifice 31 provided in the sheet metal strip 27.

When the filament is installed in a vehicle the knife 30 is first inserted into the orifice 31 of the strip 27 and the free end of the strip is pulled through the through-slit 32 of the fitment body subsequently to be shaped to form the plate 28. It is apparent that the sheet metal strip 27 is capable of being slit by the knife blade 30 under the effect of a considerable traction force exerted on the fitment 5 by the webbing strap 6.

As is shown in FIG. 8, the coil 20 is connected to an electric circuit supplied by a current source S. The circuit comprises a circuit breaker $I_1$ actuated by, in this case, the vehicle brake pedal P and a further circuit breaker $I_2$ adapted to close under the action of a sudden deceleration. The circuit breakers $I_1$ and $I_2$ are connected in parallel.

When the driver of the vehicle depresses the brake pedal P the circuit breaker $I_1$ is closed, and when the vehicle is subjected to an abrupt deceleration the circuit breaker $I_2$ is also closed. In either case the current source S becomes connected to the coil 20 to supply it with electric current. The coil 20 is so connected in the circuit that is repels the armature 19 to the position shown in FIG. 5, thus pivoting of the links 21 about their axes 23, 23' which causes the shoe 17 to move in the direction of the arrows $F_1$ and $F_2$. This arrangement causes a self-tightening engagement of the strap 3 to be obtained. De-energisation of the coil 20 causes the shoe to withdraw under the action of the counteracting return force exerted by the strap coiling device 1.

In the alternative embodiment shown in FIGS. 6 and 7 the sheet metal body 110 carries a frame the arms 134, 134' of which each have respective elongate openings 135, 135' in which there is slidingly mounted a cross-tie 136 integral with one of the ends of two connecting links 137, 137' disposed at either side of the body 110.

At their other ends the links 137, 137' have shafts 138, 138' which are integral with the shoe 17 and are mounted for sliding in elongate openings 139, 139' provided in the wings 111, 111' of the body 110.

As in the preceding embodiment, the shoe 117 is actuated by the coil 120 repelling the armature 119 which is integral with the shoe 117.

At its exit from the window 113 the webbing strap 3 is engaged under the cross-tie 136 in such manner that when an unusually high tension is applied to the strap 6 the strap first of all pulls the cross-tie 136 and hence also the links 137, 137' and the shoe 117 to initiate movement of the shoe against the strap 3.

This action is combined with that of the electromagnetic actuating means which plays an auxiliary role of additional safety.

It suffices in this case for the force exerted on the shoulder strap 6 to be greater than the strap return force exerted on the strap 3 by the belt storage device 101 which is analogous in its effect to the coiling device 1 of FIGS. 1 to 5.

This device comprises essentially a sheath and the strap 3 has folds into which the webbing is biased to retract by means of a resiliently extensible plate 141.

The electric supply for the coil 120 is the same as that of the coil 20 and for this purpose the same circuit is employed as the one shown in FIG. 8.

I claim:

1. In a vehicle having a safety belt system which includes a strap extending between anchorages on the vehicle body and tensioned between said anchorages: a fitment constructed for slidably receiving said strap, said fitment comprising a body, aperture means on said body for allowing admission of said belt into said body, brake shoe means disposed to clamp said strap with respect to said body, support means comprising a pair of link means connected to said body and to said brake shoe means for supporting said brake shoe means for movement between a first position in which said strap is clamped and a second position in which said strap is released, and driving means for driving said brake shoe means into said first position, said driving means including first and second brake actuating means including a cross-tie disposed to engage said strap, means connecting one end of each of said link means to said cross-tie, frame means integral with said fitment body, elongate openings in said frame means disposed to slidably receive said cross-tie, and attachment means connected to the other end of each of said link means, further elongate openings in said fitment body disposed to slidably receive said attachment means, and means pivotally connecting said attachment means to said brake shoe means.

2. A fitment as set forth in claim 1, wherein said attachment means comprise two separate pins, each pin being connected to both said brake shoe means and one of said links, and each pin being disposed in a respective one of said elongate openings.

3. A fitment as set forth in claim 1, wherein said second actuating means means for driving the brake shoe means into said first position comprise electromagnetic control means which consist of an electrically conductive coil fixed to said fitment body, an armature fixed to said movable brake shoe means, and means for energising said coil to move said armature.

4. A sliding fitment for a safety belt comprising two anchorage points, a device for the elastic drawback of the belt at one anchorage point, a fitment body, a belt slidably mounted in the fitment body, means comprising a brake shoe for clamping said belt into position under the action of a brake shoe and an electro-magnetic means for moving the brake shoe into its clamping position, at least one pair of connecting links connected to the shoe and to the body mounting the brake shoe in the fitment body, one of the ends of said connecting links being secured externally of the body to a cross-tie on which the belt comes to rest when coming out of the body, a frame integral with said body and having elongated openings therein, said cross-tie being mounted for sliding in the elongate openings, said body having elongated openings therein adjacent the opposite ends of the links, shafts slidably disposed through the elongated openings in the body secured at one end to a link and at the other end to the brake shoe.

5. The sliding fitment of claim 4, characterized in that the electro-magnetic control means are constituted by a coil which is integral with the fitment body and which cooperates with a mobile armature, which is integral with the brake shoe.

6. A safety belt assembly for a vehicle comprising a means for coiling one end of a belt, said coiling means being fixed to a vehicle adjacent to one side of a seat in the vehicle, means adjacent to an opposite side of the seat for detachably securing an opposite end of the belt to the vehicle, and a belt guide and support means disposed between the coiling means and detachably securing means and fixed to the vehicle at a point elevated above the shoulders of an occupant sitting on said seat whereby a belt passing therethrough and secured on said coiling means and to said detachably securing means will cross diagonally from the occupant's shoulder across his body to the detachably securing means, said belt guide and support means comprising a slot and associated exit opening for said belt, a braking means disposed in the said belt guide and support means facing said slot, electro-magnetic means for moving the braking means towards and from the slot, a pair of sprocket brackets fixed externally to the belt guide and support means below the exit opening and having elongated slots therein, a pair of linkage members disposed adjacent to and within the space between the said brackets; a cross-tie member disposed across the space between the linkage members, projecting through the said elongated openings and secured at its ends to the linkage members and means for securing said linkage members to the braking means for movement therewith, and a belt coiled at one end about the coiling means, threaded through the slot and exit opening, between the cross-tie member and the belt guide and supporting means and detachably secured at its other end to said detachably securing means, whereby upon the application of tension on the strap the cross-tie is moved away from the guide and support means in said bracket slots and the braking means is moved towards the slot in the guide and support means and into braking engagement with the belt therein.

* * * * *